US010817081B2

(12) United States Patent
Kolarov

(10) Patent No.: US 10,817,081 B2
(45) Date of Patent: Oct. 27, 2020

(54) QUALIFIED ELECTRONIC SIGNATURE DEVICE IN THE FORM OF STYLUS AND METHOD OF ITS USE

(71) Applicant: Peter Kolarov, Bratislava (SK)

(72) Inventor: Peter Kolarov, Bratislava (SK)

(73) Assignee: Peter Kolarov, Bratislava (SK)

( * ) Notice: Subject to any disclaimer, the term of this patent is extended or adjusted under 35 U.S.C. 154(b) by 0 days.

(21) Appl. No.: 16/091,867

(22) PCT Filed: Apr. 6, 2017

(86) PCT No.: PCT/IB2017/051983
§ 371 (c)(1),
(2) Date: Oct. 5, 2018

(87) PCT Pub. No.: WO2017/175169
PCT Pub. Date: Oct. 12, 2017

(65) Prior Publication Data
US 2019/0121454 A1 Apr. 25, 2019

Related U.S. Application Data

(60) Provisional application No. 62/319,863, filed on Apr. 8, 2016.

(51) Int. Cl.
*G06F 3/0354* (2013.01)
*H04L 9/32* (2006.01)
(Continued)

(52) U.S. Cl.
CPC ........ *G06F 3/03545* (2013.01); *G06F 3/0383* (2013.01); *G06F 21/33* (2013.01);
(Continued)

(58) Field of Classification Search
None
See application file for complete search history.

(56) References Cited

U.S. PATENT DOCUMENTS

2003/0012374 A1    1/2003   Wu
2009/0157538 A1    6/2009   Subramaniam
(Continued)

FOREIGN PATENT DOCUMENTS

EP    2582115    4/2013
EP    3121992    1/2017

OTHER PUBLICATIONS

Official Journal of the European Union, dated Aug. 28, 2014; pg. L 257/73, entitled, "Regulation (EU) No. 910/2014 of the European Parliament and of the Council of Jul. 23, 2014 on electronic identification and trust services for electronic transactions in the internal market and repealing Directive 1999/93/EC".

*Primary Examiner* — Duane N Taylor, Jr.
(74) *Attorney, Agent, or Firm* — Woodard, Emhardt, Henry, Reeves & Wagner, LLP

(57) ABSTRACT

A qualified electronic signature device in the form of stylus and method of its use wherein a smart stylus contains a stylus tip, a smart card chip, a processing unit with memory, motion sensor, pressure sensor, a RF transceiver, power control button, LED diode, integrated battery and real-time clock module. The device further contains an external computing device and an electronic dataset. A smart stylus enables qualified electronic signature by means of identifying the signatory via hand written characteristics and behavioural features. At least one characteristic trait of a person who signs an electronic dataset is captured for evaluation. Subsequently, to authenticate the signatory, the captured electronic dataset is evaluated against behavioural templates stored in smart stylus prior to authentication. Upon successfully authenticated signatory, an integrated smart card chip digitally signs an electronic dataset fingerprint obtained via RF transceiver from an external computing device presenting the electronic dataset.

4 Claims, 5 Drawing Sheets

(51) Int. Cl.
*G06F 3/038* (2013.01)
*G06F 21/64* (2013.01)
*H04L 29/06* (2006.01)
*G06F 21/33* (2013.01)
*H04L 9/30* (2006.01)

(52) U.S. Cl.
CPC ............ *G06F 21/64* (2013.01); *H04L 9/3073* (2013.01); *H04L 9/321* (2013.01); *H04L 9/3231* (2013.01); *H04L 9/3234* (2013.01); *H04L 9/3247* (2013.01); *H04L 9/3263* (2013.01); *H04L 9/3268* (2013.01); *H04L 9/3297* (2013.01); *H04L 63/0861* (2013.01); *G06F 2203/0384* (2013.01)

(56) References Cited

U.S. PATENT DOCUMENTS

2012/0026180 A1* 2/2012 Kuchenbecker ........ G06F 3/016 345/582
2015/0346847 A1* 12/2015 Zachut ................ G06F 3/03545 345/174
2016/0357275 A1* 12/2016 Ribeiro ................... G06F 21/35

\* cited by examiner

QUALIFIED ELECTRONIC SIGNATURE DEVICE IN THE FORM OF STYLUS AND METHOD OF ITS USE

TECHNICAL FIELD

The present invention relates generally to qualified electronic signature device in the form of stylus and method of its use for signing electronic dataset applying behavioural characteristics of a handwritten signature, and more particularly, for use during signing of electronic documents such as PDF in mobile environments with qualified electronic signature.

BACKGROUND

Electronic signatures are becoming prevalent in today's e-commerce based economies where many business actors are trying to remove paper from the document workflow. Traditional ink-on-paper handwritten signatures are usually the hurdle for business documents, such as contracts, to overcome on the way to pure paperless workflow. Unfortunately, it is not an easy problem to solve due to EU legislature, usability, and technical issues.

Different countries use different laws in regards to electronic signature acceptance as a replacement for the traditional ink-on-paper handwritten signature. There are many types of electronic signatures, however only digital signatures based on a cryptographic algorithms are able to guarantee certain security aspects of the signature and dataset being signed.

Prior Art devices for digital signatures based on cryptographic algorithms as described in "SECURE ELECTRONIC SIGNING OF INFORMATION" according patent No EP 3121992. The method comprising the detection of signatory data characteristics, if a person at the first device first information signs; outputting of second information including at least one representation of the signature data to a second device; receiving a representation of at least part of the second information from the second device; determining whether at least a part of the representation corresponds to at least a portion of the second information on at least a portion of the second information, wherein if it has been found that at least a part of the representation of at least part of the second information on at least a portion of the second information corresponds, at least the step of calculating a hash value is executed. The disadvantage of said invention is failure to meet the terms of European Union legislation.

Using digital signature automatically protects the electronic dataset against possibility of hiding changes to the electronic dataset after the signature has been applied. Thus, the primary purpose of a digital signature is to protect the integrity of the signed dataset. Furthermore, digital signatures, when adhering to certain predefined standards, may carry identity of the signatory for the non-repudiation proof. This identity could be pre-verified, e.g., when X509 PKI standard is used with some trusted authority certifying the cryptographic keys prior to signing, or an identity could be post-verifiable when a digital signature carries certain metadata and features that can be evaluated by forensic experts, e.g., when electronically digitised handwritten signature is part of the signing process. The X509 PKI standard is currently the preferred way of asserting a signatory s identity when digital signature is used. Even though no technical details are mentioned, EU's legal framework has been heavily influenced by the X509 PKI standard when it comes to the definition of the most secure electronic signature. EU legal framework has defined this golden standard for the electronic signature and refers to this type of signature as a qualified electronic signature (in the following, referred to as QES).

The EU Regulation No 910/2014 regarding electronic signature (in the following, referred to as EIDAS) defines QES, besides other requirements, as a digital signature created by signature creation data (in the following, referred to as private key) located in a qualified electronic signature creation device. In practice, this means that if a signatory wants to create an electronic signature meeting the QES standard of EIDAS regulation, the signatory must have sole access to the private key used in the asymmetric cryptographic operation required for the digital signature of an electronic dataset. In most situations today this strict security requirement is met by a combination of the following technical means: secure smart card with private key and qualified certificate, smart card reader accepting said smart card optionally with PIN pad and a display, and another computing device presenting said electronic dataset to be signed. To prove the sole access to the private key on the smart card, the signatory inputs secret numerical code (PIN) on the computing device or optionally (for extra security), directly on the smart card reader. If cryptographic operation for said electronic dataset, the external computing device then attaches the result of such operation to the electronic dataset as its QES.

Forms of authentication that use mobile telephones or smartphones as medium to ensure digital identity in mobility are also known. Till now there has been used the method and device for QES described in the patent No EP2582115 entitled, "A qualified electronic signature system, associated method and mobile phone device for a qualified electronic signature." A qualified electronic signature system is configured to exchange data with the first processing means of the requester configured to allow a requester to generate requests for requesting a qualified electronic signature through said system to a recipient. Said system comprising second processing means of the recipient configured to allow the recipient of the request to sign his/her qualified electronic signature, said second processing means comprising a mobile phone device for qualified electronic signature of mobile type, adapted to exchange text-based communications on mobile telecommunications networks on the basis of an identifier of the recipient subscribed to the mobile telephone service comprised in a Subscriber Identity Module with which he/she is associated.

Currently, offered QES creation devices on the market offer a variety of authentication mechanisms which are either knowledge based, e.g., PIN code, physical biometry based, e.g., fingerprint sensor or combination thereof. These devices do not enable traditional pen-like signing ceremony, and their authentication mechanism is not familiar to a natural person. Furthermore, until now, it has been feasible to process sophisticated behavioural characteristics captured from a multitude of motion (accelerometers, gyroscopes, magnetometers) and pressure sensors to achieve authentication based on handwriting behaviour recognition in a small embedded device. Such data evaluation requires a good amount of processing power and memory while power consumption must be kept at a minimum. Additionally, the device has to integrate an RF transceiver (e.g., a low energy Bluetooth module) and a fixed or removable EAL 4+ certified security module with QES creation data which further increases complexity of the apparatus in the form of a smart stylus. Most importantly, no existing QESD on the market integrates a secure time stamp module using an internal real-time clock.

SUMMARY OF THE INVENTION

The qualified electronic signature device in the form of a stylus and method of its use, eliminates or significantly limits the disadvantages noted above. The process for executing a QES is very different from traditional wet-ink on paper signing ceremony, yet EIDAS regulation states that only QES should be equivalent to the traditional handwritten signature. This difference constitutes a real problem for people not familiar with digital signature infrastructure and limits usage of electronic signature in the EU. It is an aim of the present invention in combination with modern touch screen devices, to obviate the above-mentioned problem by closing the gap between the current QES and traditional signing ceremonies.

SOLUTION

The present invention of the qualified electronic signature device in the form of a stylus provides electronic dataset signing apparatus in the form of a smart stylus which replaces the combination of a smart card reader as a technical means required for executing QES. The smart stylus integrates an embedded smart card chip, which is optionally removable. Additionally, the smart stylus integrates at least one processing unit with memory, at least but usually a multitude of motion and pressure sensors, and an RF transceiver for communicating transaction information to an external computing device. The smart stylus contains an integrated battery as an energy source, or harvests wireless energy if such is present. The embedded smart card chip stores one or a multitude of digital certificates and private keys which, in turn, serve as the signature creation data. If one of the certificates stored within the smart card chip has been certified (digitally signed) by certificate authority as to be qualified, then the smart stylus becomes a Qualified Electronic Signature Device (in the following, referred to as QESD).

The present invention additionally contains a real-time clock module as a part of the main processing unit (in the following, referred to as RTC) in order to provide a secure time stamp for the digital signature. A secure time stamp is produced by taking an RTC module time reading and digitally signing this time reading with a trusted certificate stored inside the smart stylus. Furthermore, the RTC module is tamper resistant and any attempt to change the time causes the RTC to reset to the initial time or epoch, e.g., 1970-1-1. In order to set the RTC to a new value, the RTC module needs to receive a digitally signed time stamp with a valid certificate that is trusted by the smart stylus. Certificates or their signing certificate roots that are trusted by the smart stylus are always securely stored within the secure module of the smart stylus.

The authentication mechanism to the QESD is based on the behavioural feature captures by a multitude of motion and/or pressure sensors during the handwritten signature ceremony. This authentication certificate replaces the usual PIN code required by standard smart card reader-based digital signatures. All of the integrated components required for capturing behavioural data, evaluating captured data, and for executing digital signatures, are housed in a the format of a writing stylus. The tip of the stylus is irrelevant to this invention and it is a standard ink cartridge for use on paper, while other embodiments utilise pen tips appropriate for a given environment, e.g., any capacitance creating tip compatible with common touch screen displays for signing in a mobile environment. As used herein unless the context indicates otherwise, a stylus is any device that is compatible with either the hand or finger of the user for purposes of marking on an essentially flat surface, or on a mobile device touch screen. While the drawings depict a conventional shape of a stylus, other shapes and designs are also included within the scope of the present invention, such as any attachment to a finger or any implement that can be held with a hand for such purpose.

The smart stylus of the present invention has a multitude of uses, and primarily for purposes of illustration, includes a QES of electronic documents such as PDF documents on touch screens of mobile computing devices. Other uses may serve the purpose of authentication at POS terminals via digital signature and certificate, web site authentication via digital signature and certificate, cryptocurrency transaction if one is based on digital signature, and wherever digital signatures are executed by a natural person using standard smart card readers with smart cards or other security tokens such as a USB-based security token.

The authentication security required to access the private key in the smart card chip using the handwriting recognition can be further enhanced by requiring the signatory to unlock the security module prior to signing, by means of some secret sign other than the signatory's signature, e.g., by handwriting a simple word or pictogram which visual form does not become part of the signed dataset unlike the signature itself, which visual form can be publicly disclosed and usually is attached as part of the signed document.

The method of use of QESD according of invention is based on a establishing of a connection between the external computing device and the smart stylus held by signatory. In the first step the signatory activates the smart stylus before signing by pressing the power control button. Once optional LED diode or external computing device shows smart stylus in ready to sign mode, the signatory start to execute her/his hand written signature. Then ensues pairing of the smart stylus with the touch screen enabled external computing device. Next step establish mutual encrypted RF connection between smart stylus and the external computing device using standard cryptographic forward secrecy method. Then the external computing device reads all certificates from the smart card chip and presents them to the signatory for selection. In next step the external computing device securely sends fingerprint (cryptographic hash code) of the document being signed via the RF communication channel to the smart stylus. The smart stylus evaluates the behavioural characteristics of the signatory. The smart card chip checks authentication data from the main processing unit and if the authentication data are valid, the smart card chip signs the electronic dataset provided by the RTC module of the main processing unit optionally attaching the secure time stamp. Once the data is signed and passed back to main processing unit, in the next step the main processing unit sends signed data via the RF transceiver to the external computing device so the digital signature can be incorporated into the electric dataset being signed. In case of unsuccessful authentication, the main processing unit broadcasts failure to sign signal to the external computing device via RF transceiver. The last step creates additional behavioural characteristic template from the last successful hand written signature and optionally replaces older template which has the lowest matching score achieved during evaluation.

ADVANTAGEOUS EFFECTS OF THE INVENTION

The main advantage of the innovative qualified electronic signature device in the form of a stylus and method of its use, is that the invention provides the extremely secure and intuitive technique for signing electronic documents with a EU legislature compliant QESD, especially when the smart stylus is used along with the mobile touch screen devices. The possibility of using a QESD in the form of a stylus replaces the usual PIN code required by a standard smart card reader-based digital signatures, which makes it suitable for wide usability.

Another advantage of the qualified electronic signature device in the form of a stylus and method of its use not only enables a traditional signing ceremony, but also provides much higher security. The security aspect of the invention is based on the so-called behavioural biometry which authenticates a natural person during the process of a signature handwriting ceremony. This authentication process is hidden from the signatory and does not require the signatory to remember complex numeric secret codes which can be stolen. It is more secure today than a traditional handwritten signature.

Another benefit of the invention is the possibility to sign a few documents at once, and using this invention can also reduce the financial impact of human error.

BRIEF DESCRIPTION OF THE DRAWINGS

The invention of the qualified electronic signature device and method of its use is described by the appended claims in relation to the description of a preferred embodiment with reference to the following drawings which are described briefly as follows:

DESCRIPTION OF THE EMBODIMENTS

Figure 1:
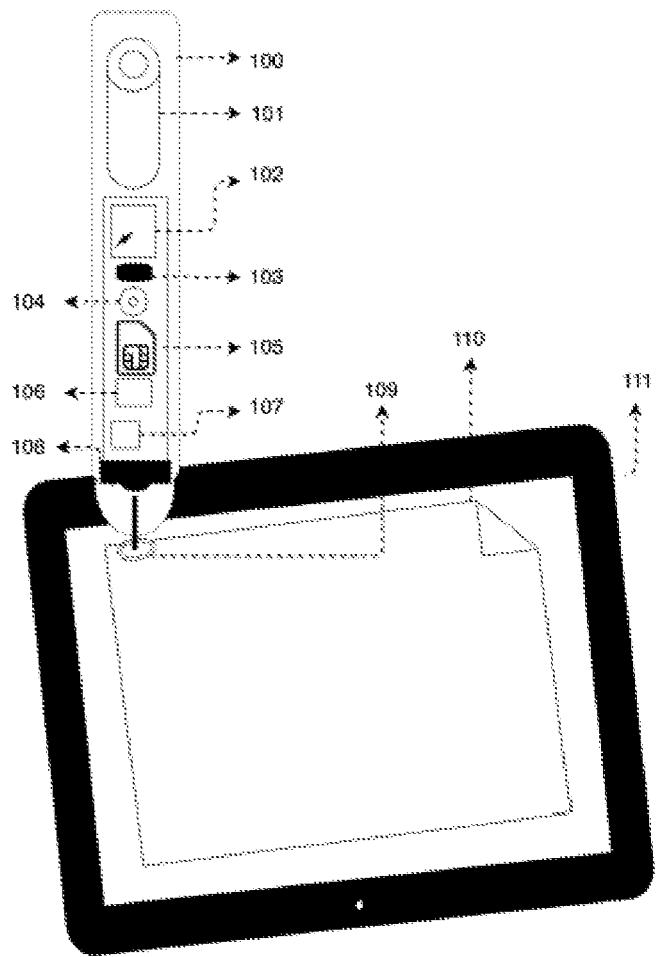
FIG. 1 is the diagram of the preferred embodiment of the qualified electronic signature.

FIG. 1 depicts various aspects of exemplary embodiments of the present invention. A qualified electronic signature device in the form of a stylus, using the smart stylus 100, which contains the embedded removable smart card chip 105, at least one processing unit 106 with memory, at least one but usually a multitude of motion sensors 107 and pressure sensors 108 and an RF transceiver 102. The smart stylus 100 additionally contains integrated battery 101 as an energy source or harvest wireless energy and real-time clock module as part of the main processing unit 106, power control button 103, and optional LED diode 104. The smart card chip 105 stores one or a multitude of digital certificates and private keys, which in turn serve as the signature creation data. The qualified electronic signature device in the form of a stylus additionally contains the electronic dataset 110 and the external computing device 111.

Figure 2:
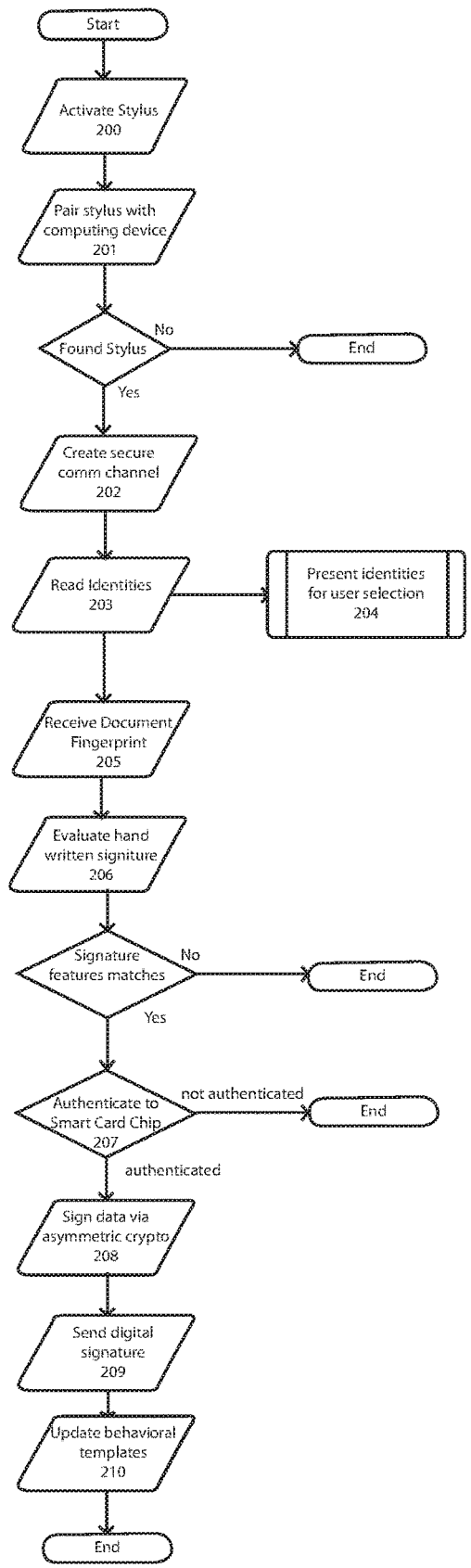
FIG. 2 is a process flow diagram of the method of signing the document with QESD.

FIG. 2 is a process flow diagram of the basic steps in implementation of the method of signing the document with a QESD according to the present invention in the preferred embodiment. In this method, a connection is established between the external computing device 111 and the smart stylus 100 held by the signatory. In step 200, the signatory activates the smart stylus 100 just before signing by pressing the power control button 103. Once the optional LED diode 104 or external computing device 111 shows that the smart stylus 100 is in ready to sign mode, the signatory starts to execute her/his handwritten signature. Step 201 allows pairing of the smart stylus 100 with the touch screen enabled external computing device 111 and selects which smart stylus 100 it should start communication with. Step 202 establishes a mutual encrypted RF connection between smart stylus 100 and the external computing device 111, using a standard cryptographic forward secrecy method. In an optional step 203, the external computing device 111 reads all present certificates from the smart card chip 105 and presents 204 of them to the signatory for selection. Each certificate may present a different digital identity of the natural person using the smart stylus. In step 205, the external computing device 111 securely sends the fingerprint (cryptographic hash code) of the document being signed via the RF communication channel to the smart stylus 100. In the next step 206, the smart stylus 100 evaluates the behavioural characteristics of the signatory. Step 207 produces authentication data in the main processing unit 106 of the smart stylus 100 if the signatory has been successfully identified. In step 208, the smart card chip 105 checks the authentication data from the main processing unit 106 and if the authentication data is valid, the smart card chip 105 signs the electronic dataset 110 provided by the RTC module of the main processing unit 106, optionally attaching the secure time stamp if one is requested. Once the data is signed and passed back to the main processing unit 106, in the next step 209, the main processing unit 106 sends the signed data via the RF transceiver 102 to the external computing device 111 so that the digital signature can be incorporated into the electric dataset 110 being signed. In case of an unsuccessful authentication, the main processing unit 106 broadcasts a failure to sign signal to the external computing device 111 via the RF transceiver 102. The last step 210 creates an additional behavioural characteristic template from the last successful handwritten signature and optionally replaces the older template which has the lowest matching score achieved during evaluation.

Figure 3:
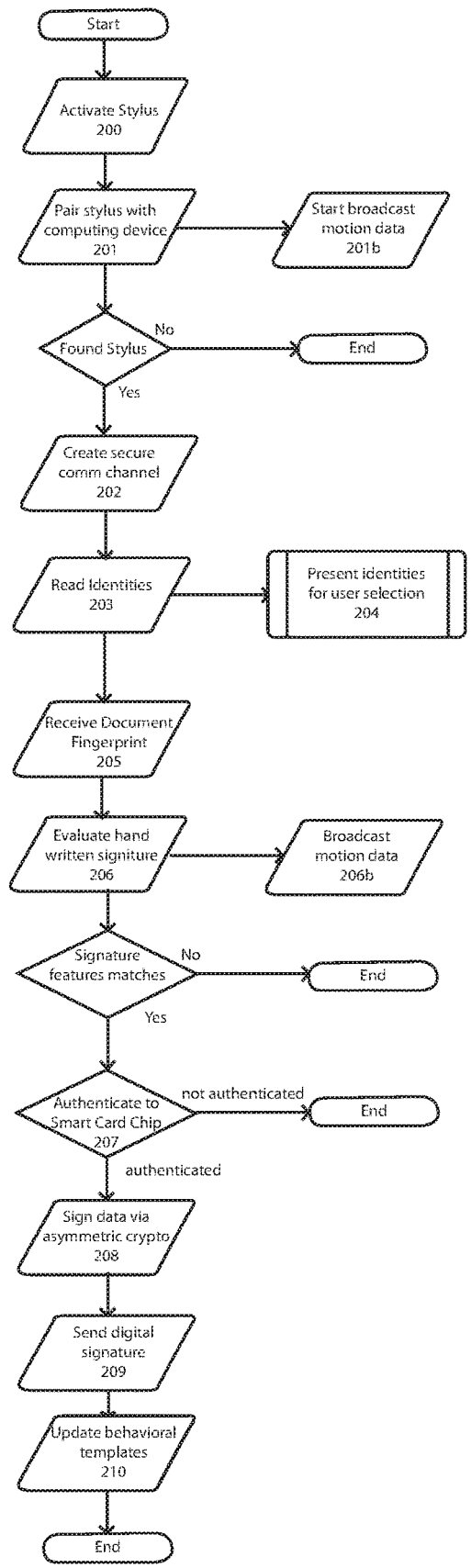
FIG. 3 shows the alternate flow for method of signing the document with QESD and with broadcasted pressure and encrypted motion data.

FIG. 3 shows a flow diagram for an alternative embodiment of the above method, with step 201b added where the smart stylus 100 continuously broadcasts via the RF transceiver 102, the pressure level of the stylus tip 109, or other encrypted behavioural data during the handwritten signature ceremony starting immediately after the smart stylus 100 has been activated by the power button 103. This additional step allows for more precise pairing of the smart stylus 100 with the external computing device 111, and which may be a hand-held touch screen device to eliminate false touches of the screen by another object. Furthermore, in this embodiment it may be possible for the touch screen external computing device 111 to create a better visual of the handwritten signature if the pressure points are taken into account in real-time along with the spatial coordinates seen by the external computing device's touch screen. Additionally, if asymmetrically encrypted behavioural data is also broadcasted by the smart stylus 100 during the signing ceremony, this data may be appended to the electronic dataset 110 being signed, as additional signature metadata for possible later forensic evaluation purposes.

Figure 4:
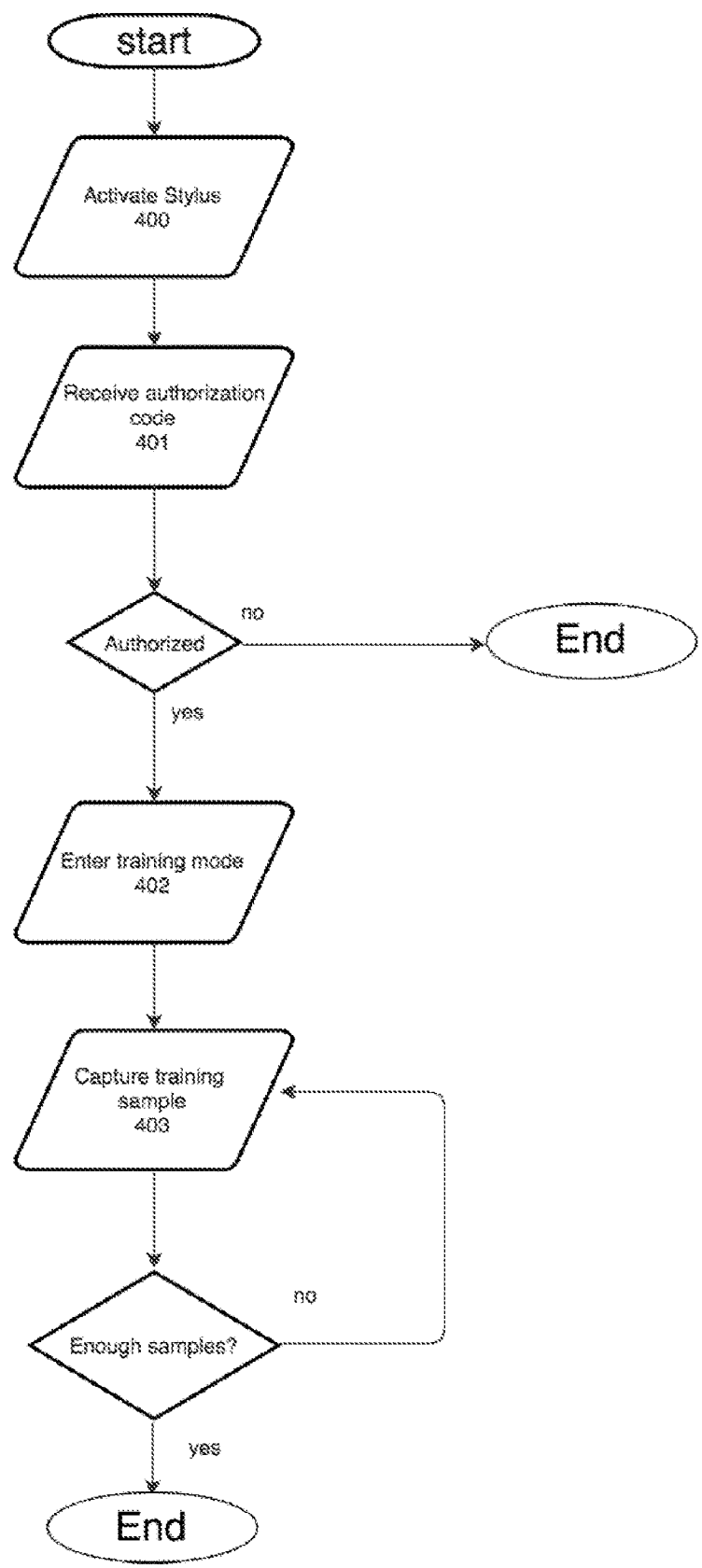
FIG. 4 shows basic flow for training the stylus of qualified electronic signature device.

FIG. 4 shows a basic flow diagram for training the stylus of a qualified electronic signature device by capturing a multitude of owner handwritten signatures with the step required for the method of initialising the smart stylus 100 apparatus. In this flow, the smart stylus 100 starts in the state when no behavioural templates exist for identifying the handwriting of the natural person, or the templates needs to be changed by the owner of the smart stylus 100. In the step 401 after the activation 400, the external computing device 111 sends via a secured RF channel to the smart stylus 100 a unique unlock code, which is provided by the user to authenticate the user (future signatory) as the rightful smart stylus 100 owner. If successful, in the step 402, the smart stylus 100 enters a signature training state; otherwise, the user is presented with a failed authentication message by the external computing device 111. In the next step 403, the smart stylus 100 is ready to accept a handwritten signature as a first training sample. Step 403 repeats until enough training samples have been obtained by the smart stylus 100—the number of repeats depending on the handwritten signature used by the signatory, and this amount varies from a minimum of 3 samples to a maximum of 6 initial samples. The last step modifies the state of the stylus to be initialised and ready for signing electronic datasets.

Figure 5:
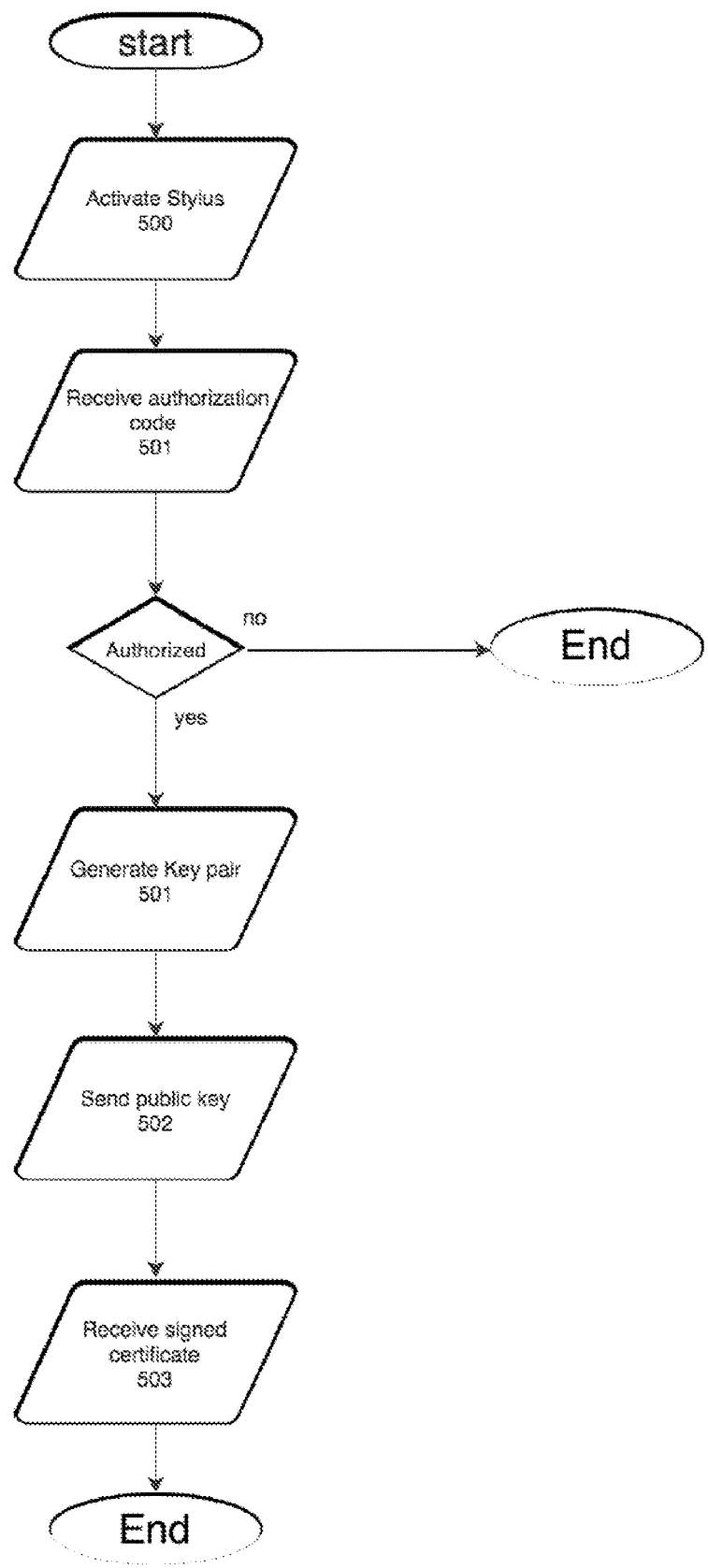
FIG. 5 is basic flow diagram of obtaining new qualified electronic signature creation data.

FIG. 5 shows the process flow diagram of the method for creating qualified electronic signature creation data, i.e., qualified certificate with private key, in the case when the smart card chip 105 does not contain such valid certificate and private key combination, or the owner wishes to add an additional certificate to the smart stylus 100. In the step 501, the owner of the smart stylus 100 authenticates after activation 500 using her/his own handwritten signature and proves the ownership of the smart stylus 100, alternatively providing a secret authentication code using external computing device 111 for authentication. If successfully verified, the authentication data is provided by the main processing unit 106 to the smart card chip 105 as a proof of ownership link between the smart card chip 105 and the smart stylus 100. Upon this authentication, the external computing device 111 has access to all existing certificates contained within the smart card chip 105, if any exist, for reading and writing. The step 501 generates a new random private key which is never externally readable, and associated public key on the smart card chip 105. The step 502 sends a public key via RF transceiver 102 to an external computing device 111 for creation of a certificate signing request. The step 503 receives an externally signed certificate for the new public private key pair and stores the certificate in the smart card chip 105 of the smart stylus 100, associating it with the newly generated key pair. If the certificate received and stored within the smart card chip 105 has been certified (digitally signed) by a trusted certificate authority, as to be qualified, then the smart stylus 100 becomes a QESD.

EXAMPLE 1

Example 1 is a qualified electronic signature device in the form of a stylus. The example qualified electronic signature device in the form of stylus includes the smart stylus 100, which contains the embedded removable smart card chip 105, standard SIM sizes such as a Nano SIM, a Micro SIM, or a Mini Sim; the main processing unit 106 which includes the memory, one or more processors and an RTC module; motion sensors 107; pressure sensors 108; RF transceiver 102; an integrated battery 101 as an energy source, or harvest wireless energy in the housing. The smart stylus 100 additionally contains a power control button 103; LED diode 104 for signaling the state of the smart stylus 100; replaceable stylus tip 109 for creating capacitance to be compatible with the touch screen of the external computing device 111. The smart card chip 105 stores one or a multitude of digital certificates and private keys which in turn serve as the signature creation data. The qualified electronic signature device in the form of a stylus additionally contains the electronic dataset 110 and the external mobile computing device 111 with touch screen. In the preferred embodiment, an RF transceiver 102 module supports one or a multitude of standard communication protocols such as Bluetooth, Bluetooth LE, or NFC.

EXAMPLE 2

Example 2 is a qualified electronic signature device in the form of a stylus. The example qualified electronic signature device in the form of stylus includes the smart stylus 100, which contains the main processing unit 106, which includes the memories, processors, RTC module, real-time clock module, and the integrated smart card chip 105; motion sensors 107; pressure sensors 108; an RF transceiver 102; and integrated batteries 101 in the housing. The smart stylus 100 additionally contains a power control button 103; LED diode 104 for signaling the state of the smart stylus 100; and a standard replaceable ink cartridge stylus tip 109 for writing on the paper. Example 2 additionally contains the electronic dataset 110 and the external computing device 111.

REFERENCE SIGNS LIST 100 smart stylus
101 integrated battery
102 RF transceiver
103 power control button
104 LED diode
105 smart card chip
106 main processing unit
107 multitude motion sensor
108 pressure sensors
109 stylus tip
110 dataset
111 external computing device

CITATION LIST

Patent Literature

EP 3121992
EP2582115

The invention claimed is:
1. A method of using a qualified electronic signature device in the form of stylus having the following steps: a signatory activates a smart stylus by pressing a power control button once LED or an external computing device shows smart stylus in ready to sign mode, the signatory starts to execute her/his hand written signature; then starts the step of pairing of the smart stylus with the external computing device; creating a mutual encrypted RF connection between the smart stylus and the external computing device using standard cryptographic forward secrecy method; the external computing device reads all present certificates from the smart card chip and presents them to the signatory for selection; the external computing device securely sends fingerprint of the document being signed via the RF communication channel to the smart stylus; after that the smart stylus evaluates the behavioural characteristics of the signatory; a main processing unit of the smart stylus produces authentication data and the smart card chip checks authentication data from the main processing unit; if the authentication data are valid the smart card chip signs the electronic dataset provided by a real-time clock module of main processing unit optionally attaching the secure time stamp; once the data is signed and passed back to main processing unit the main processing unit sends signed data via the RF transceiver to the external computing device so a digital signature can be incorporated into the electronic dataset being signed; and creating additional behavioural characteristic template from the last successful hand written signature and optionally replacing older template which has the lowest matching score achieved during evaluation.

2. The method of claim 1, further comprising the step of starting broadcast motion data after the step of pairing the smart stylus with external computing device and the step of starting broadcast motion data after the step of evaluating hand written signature.

3. The method of claim 2, further comprising the step required for the method of initializing the smart stylus, in the first step the smart stylus starts in the state when no behavioural templates exist for identifying the handwriting of the natural person or the templates need to be changed by the owner of the smart stylus, in the step after the stylus activation the external computing device sends the unique unlock code provided by user via secured RF transceiver to the smart stylus, if the previous step is successful, the smart stylus enters signature training state, otherwise the user is presented with failed authentication message by the external computing device, in next step, the smart stylus is ready to accept hand written signature as a first training sample, the step repeats until enough training samples have been obtained by the smart stylus, the number of repeats amount varies from minimum of 3 samples to maximum of 6 initial samples, the last step modifies the state of the smart stylus to initialized and ready for signing the electronic dataset.

4. The method of claim 3, and further comprising the step by which the owner of the smart stylus authenticates after activation using her/his own handwritten signature and proves the ownership of the smart stylus, alternatively provides secret authentication code using external computing device for authentication;

if successfully verified authentication data are provided by the main processing unit to the smart card chip the step generates new random private key which is never externally readable and associated public key on the smart card chip; sending public key via RF transceiver to an external computing device for creation of a certificate signing request; receiving externally signed certificate for the new public private key pair and storing the certificate in the smart card chip of the smart stylus associating it with the newly generated key pair; if the certificate received and stored within the smart card chip has been certified by trusted certificate authority as to be qualified, then the smart stylus becomes a Qualified Electronic Signature Device.

\* \* \* \* \*